United States Patent [19]

Kotani et al.

[11] 4,250,063
[45] Feb. 10, 1981

[54] METHOD FOR CHAIN-OPENING POLYMERIZATION OF NORBORNENE DERIVATIVES

[75] Inventors: Teizo Kotani; Shuichi Matsumoto; Katsutoshi Igarashi; Kazuo Suzuki, all of Yokohama, Japan

[73] Assignee: Japan Synthetic Rubber Co., Ltd., Tokyo, Japan

[21] Appl. No.: 5,503

[22] Filed: Jan. 22, 1979

Related U.S. Application Data

[63] Continuation of Ser. No. 815,320, Jul. 13, 1977, abandoned.

[30] Foreign Application Priority Data

Jul. 13, 1976 [JP] Japan ................. 51-82573
Sep. 14, 1976 [JP] Japan ................ 51-109413

[51] Int. Cl.³ ............... C08F 4/16; C08F 4/22; C08F 18/00
[52] U.S. Cl. ............... 260/4 R; 252/429 R; 525/245; 526/113; 526/280; 526/281
[58] Field of Search ............ 260/4 R; 525/245; 526/113, 281

[56] References Cited

U.S. PATENT DOCUMENTS

| | | | |
|---|---|---|---|
| 3,856,758 | 12/1974 | Meshima et al. | 526/142 |
| 3,859,265 | 1/1975 | Hepworth | 526/142 |
| 3,933,777 | 1/1976 | Babitsky et al. | 526/113 |
| 3,991,139 | 11/1976 | Kokuryo et al. | 526/281 |
| 4,005,047 | 1/1977 | Chauvin et al. | 526/113 |

OTHER PUBLICATIONS

Michelotti et al., Journal of Polymer Science, Part A, 895 (1965).

*Primary Examiner*—Edward J. Smith
*Attorney, Agent, or Firm*—Oblon, Fisher, Spivak, McClelland & Maier

[57] ABSTRACT

Polymers or copolymers of norbornene derivatives can be produced by contacting in the presence or absence of an inert solvent at least one norbornene derivative substituted by at least one polar group selected from the group consisting of ester, ether, nitrile, amide, imide, acid anhydride, halogen, and silyl, or by at least one substituent having one of said polar groups; or a combination of said norbornene derivative with at least one member selected from the group consisting of cycloalkenes having no polar substituent and polymers having olefinic carbon-to-carbon double bonds; with a catalyst consisting essentially of (a) at least one coordination compound of W or Mo, the oxidation number of which is 2, 1 or 0, (b) at least one titanium tetrahalide and, if necessary, (c) at least one compound selected from the group consisting of compounds having an electron-accepting $\pi$ bond, N-halogen-substituted cyclic acid imides, sulfides, sulfoxides and phosphines. The above-mentioned catalyst is more active, cheaper, and easier to handle than the conventional catalysts containing organoaluminum compounds.

19 Claims, No Drawings

METHOD FOR CHAIN-OPENING POLYMERIZATION OF NORBORNENE DERIVATIVES

This is a continuation, of application Ser. No. 815,320, filed July 13, 1977, now abandoned.

This invention relates to a process for producing polymers or copolymers of norbornene derivatives having polar substituents. More particularly, it relates to a novel catalyst, which is highly active yet easily handled, for use in producing polymers or copolymers of norbornene derivatives having an ester group, an ether group, a nitrile group, an amido group, an imido group, an acid anhydride group, a halogen, or a silyl group as a polar substituent.

Heretofore, the process for the ring-opening polymerization of cycloolefins such as cyclopentene and cyclooctene has been studied in detail and many catalysts have been reported. The polymers thus formed have also attracted attention in the polymer industry as base materials for new rubbers and resins. On the other hand, polymers formed by ring-opening polymerization of unsaturated cyclic compounds having polar substituents such as carbonyl, cyano, and the like have recently expected to have more versatile properties and a variety of information has become available on the polymerization process.

In a process typical of such processes, polymerization is effected in emulsion in an alcohol or water using, as a catalyst, a compound of a noble metal such as Ru, Ir, and Os (French Pat. Nos. 1,556,215 and 1,594,934). However, the nobel metal compounds used in the above process are not only expensive, but also inactive for the polymerization of compounds containing a nitrile group. In more practically significant processes, a so-called Ziegler-type catalyst comprising a compound of W, Mo, or Ta and an organometallic compound of a metal of Group IA, IIA, IIB, or IIIA of the Periodic Table or a catalyst consisting of a combination thereof with an additive such as a peroxide, water, an alcohol, an epoxide, an acetal, an organic halogenated compound, an orthocarboxylic acid ester, etc. [for example, U.S. Pat. Nos. 3,856,758 and 3,859,265]. Although the so-called Ziegler type catalysts have been widely known in not only ring-opening polymerization of unsaturated cyclic compounds, but also polymerization of olefins and dienes, many of them contain an organoaluminum compound as an essential component. If it is not contained, they are not active or are very low in activity. Such an organoaluminum compound should be handled with utmost care against an attendant danger, because they ignite in air and also react explosively with water.

The present inventors have made extensive studies with an aim to develop a catalyst system suitable for carrying out in a commercial scale polymerization or copolymerization of unsaturated cyclic compounds having polar substituents, which catalyst system is inexpensive, highly active yet easy to handle, and susceptible to removal of spent catalyst components from the polymer. As a result, it has been found surprisingly that a catalyst system capable of markedly accelerating the polymerization can be obtained by using a specific compound of W or Mo together with a titanium tetrahalide, unless the aforementioned organometallic compounds are used, and that the activity of said catalyst system can be further enhanced by combining therewith a compound having an electron-accepting $\pi$ bond, an N-halogen substituted cyclic acid imide, a sulfide, a sulfoxide, or a phosphine.

An object of this invention is to provide a novel catalyst composition for use in the ring-opening polymerization of a norbornene derivative having a polar substituent.

Another object of this invention is to provide a catalyst for use in the ring-opening polymerization of a norbornene derivative, which catalyst is more active yet easier to handle and less expensive than conventional catalysts.

A further object of this invention is to provide a process for the ring-opening polymerization of the said norbornene derivative by use of the said catalyst.

Other objects and advantages of this invention will become apparent from the following description.

According to this invention, there is provided a catalyst composition consisting essentially of (a) at least one coordination compound of W or Mo, the oxidation number of which is 2, 1, or 0, (b) at least one titanium tetrahalide, and (c) at least one compound selected from the group consisting of electron-accepting compounds having an electron-accepting $\pi$-bond, N-halogen substituted cyclic acid imides, sulfides, sulfoxides, and phosphines.

According to this invention, there is further provided a process for producing a polymer or copolymer of a polar-group-substituted norbornene derivative, which comprises contacting with the above catalyst composition in the presence or absence of an inert solvent at least one norbornene derivative having at least one polar group selected from the class consisting of halogens and ester, ether, nitrile, amido, imido, acid anhydride, and silyl groups or having at least one substituent containing said polar group (said derivative being hereinafter referred to simply as polar-group-substituted norbornene derivative) or a combination thereof with at least one member selected from the group consisting of cycloalkenes having no polar substitutent and polymers having olefinic carbon-to-carbon double bonds.

Being higher in activity and free from organometallic compounds which are dangerous in handling and expensive, the present catalyst is cheaper and far less dangerous in handling than known catalysts.

The essential components of the present catalysts are (a) at least one compound selected from the coordination compounds of W and Mo, the oxidation number of which is 2, 1, or 0, and (b) at least one titanium tetrahalide. The oxidation number of W or Mo, as herein referred to, is the hypothetical number of charges remaining on the W or Mo atom on the assumption that all the electrons participating in the bonds between the W or Mo atom and each of the ligands of the coordination compound are provided by the ligands. The optional component (c) of the present catalyst is at least one compound selected from the group consisting of compounds having an electron-accepting $\pi$-bond, N-halogen-substituted cyclic imides, sulfides, sulfoxides and phosphines.

The coordination compound of W or Mo suitable for the component (a) includes, for example, carbonyl complexes, substituted carbonyl complexes, $\pi$-arene complexes, olefin complexes, cyclopentadienyl complexes, and isonitrile complexes; preferably carbonyl complexes and substituted carbonyl complexes represented by the general formula, $(CO)_nML_m$ or $D(CO)_nML'_m$;

most preferably carbonyl-carbene complexes represented by the general formula,

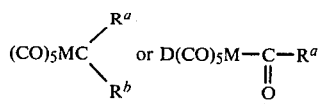

(in said formulas, M is W or Mo; L is $QR^c_3$, an alkene or alkadiene having 2 to 20 carbon atoms, an aromatic hydrocarbon radical having 6 to 20 carbon atoms, cyclopentadienyl group, allyl group,

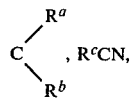

or pyridine; L' is a halogen,

or $-R^a$; D is hydrogen, Li, or $R^d_4N$; n is an integer of 1 to 6; m is 0 or an integer of 1 to 4; n+m is 4, 5, or 6; Q is N, P, As, or Sb; $R^a$ and $R^c$ are hydrocarbon radicals having 1 to 20, preferably 1 to 8, more preferably 1 to 6, carbon atoms; $R^d$ is a hydrocarbon radical having 1 to 10, preferably 1 to 8, more preferably 1 to 6, carbon atoms; $R^b$ is a hydrocarbon radical having 1 to 20, preferably 1 to 8, more preferably 1 to 6, carbon atoms or $OR^e$; and $R^e$ is a hydrocarbon radical having 1 to 20, preferably 1 to 8, more preferably 1 to 6, carbon atoms). Mixtures of 2 or more compounds capable of forming the above compounds may also be used. Examples of the compounds which may be used as the component (a) include $W(CO)_6$, $Mo(CO)_6$, $(C_6H_6)W(CO)_3$, (mesitylene)$W(CO)_3$, (toluene)$Mo(CO)_3$, $[(CO)_5WCl][(CH_3)_4N]$, $[(CO)_5Wbr][(CH_3)_4N]$, $(CO)_5WC(OCH_3)CH_3$, $(CO)_5MoC(OCH_3)CH_3$, $(CO)_5WC(OC_2H_5)(C_6H_5)$, $(CO)_5MoC(OCH_3)C_6H_5$, $(CO)_5WC(OC_2H_5)(C_4H_9)$, $(CO)_5MoC(OCH_3)(C_4H_9)$, $(CO)_5WC(OCH_3)C_2H_5$, $(CO)_5WC(C_6H_5)_2$, $[(CH_3)_4N][(CO)_5WCOC_6H_5]$, $[(CH_3)_4N][(CO)_5MoCOC_6H_5]$, $[(C_2H_5)_4N][(CO)_5WCOCH_3]$, $[(C_2H_5)_4N][(CO)_5MoCOCH_3]$, $[(C_4H_9)_4N][(CO)_5WCOC_6H_5]$, $[(CH_3)_4N][(CO)_5MoCOC_4H_9]$, $(CO)_4[P(C_6H_5)_3]WC(OCH_3)C_6H_5$, $(CO)_4[As(C_6H_5)_3]WC(OC_2H_5)CH_3$, $(CO)_5W[P(C_4H_9)_3]$, $(CH_3CN)_2W(CO)_4$, $(CH_3CN)_3W(CO)_3$, $(CH_3CN)_3Mo(CO)_3$, (pyridine)$W(CO)_5$, $(CO)_5Mo[P(C_6H_5)_3]$, $(C_6H_6)_2Mo$, $(C_5H_5)_2W$, (norbornene)$W(CO)_5$, $(CH_2=CHCOCH_3)_3W$,

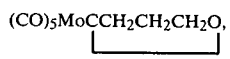

$(C_5H_5)_2Mo(CH_3CN)$, $CH_3Mo(CO)_3C_5H_5$, and $(C_5H_5)W(CO)_2Cl$. Multinuclear complexes such as $C_5H_5(CO)_3W—W(CO)_3C_5H_5$, $C_5H_5(CO)_3Mo—Mo(CO)_3C_5H_5$, and $C_5H_5(CO)_3W—Mo(CO)_3C_5H_5$ may also be used. In the above structural formulas, $C_5H_5$ represents π-cyclopentadienyl group and $C_6H_6$ represents benzene.

Compounds which may be used as the component (b) are $TiF_4$, $TiCl_4$, $TiBr_4$, and $TiI_4$, of which $TiCl_4$ is preferred.

Compounds having an electron-accepting π-bond, which can be used as the component (c), are olefins or polyolefins having a conjugated electron-attractive substituent, aromatic compounds having a conjugated electron-attractive substituent, and quinones, of which quinones and their homologous compounds are preferred. Examples of such compounds are p-benzoquinone, 4-o-toluquinone, duroquinone, chloro-p-benzoquinone, dichloro-p-benzoquinone, 2,3-dicyano-b-benzoquinone, diphenoquinone, 1,4-naphthoquinone, 2-chloro-1,4-naphthoquinone, 5,6,7,8-tetrachloro-1,4-naphthoquinone, chloranil, 9,10-anthraquinone, 1,4-anthraquinone, 1-chloroanthraquinone, 1-nitroanthraquinone, 1,8-dichloroanthraquinone, 1,5-dinitroanthraquinone, 2,7-dichloroanthraquinone, para-rosaniline, anthraquinone-1,2-dicarboxylic anhydride, dianthrone, p-quinonediphenylimine, p-quinone tetramethyldiammonium salt, tetracyanoquinodimethane, maleic anhydride, citraconic anhydride, chloromaleic anhydride, phenanthraquinone, phthalic anhydride, naphthalene-2,3-dicarboxylic anhydride, maleimide, N-nitrophenylmaleimide, tetracyanoethylene, vinylidene cyanide, diphenyl methylenemalonate, nitrobenzene, m-dinitrobenzene, trinitrobenzene, picryl chloride, and the like.

As the N-halogen-substituted cyclic acid imides which may be used as the component (c), there are preferable N-chloro- and N-bromo-substituted derivatives of dibasic cyclic acid imides. Examples of such compounds are N-chlorosuccinic acid imide, N-bromosuccinic acid imide, N-chlorophthalic acid imide, N-chloromaleic acid imide, and the like.

The sulfides, sulfoxides, and phosphines suitable for use as the component (c) are those represented by the general formulas, $R^{a'}SR^{b'}$, $R^{c'}SOR^{d'}$, and

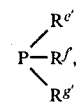

respectively (in said formulas, $R^{a'}$, $R^{b'}$, $R^{c'}$, and $R^{d'}$ are hydrocarbon or halohydrocarbon radicals having 1 to 10, preferably 1 to 8, more preferably 1 to 6, carbon atoms; and $R^{e'}$, $R^{f'}$, and $R^{g'}$ are hydrogen or hydrocarbon radicals having 1 to 10, preferably 1 to 8, more preferably 1 to 6 carbon atoms).

Examples of such compounds are dimethyl sulfide, methyl ethyl sulfide, ethyl isopropyl sulfide, di-tert-butyl sulfide, dichloromethyl sulfide, chloromethyl ethyl sulfide, diphenyl sulfide, dimethyl sulfoxide, methyl ethyl sulfoxide, ethyl siopropyl sulfoxide, di-tert-butyl sulfoxide, dichloromethyl sulfoxide, chloromethyl ethyl sulfoxide, diphenyl sulfoxide, tetrahydrothiophene, ethylphosphine, propylphosphine, phenylphosphine, diethylphosphine, dipropylphosphine, ethylphenylphosphine, diphenylphosphine, triethylphosphine, ethyldiphenylphosphine, diethylphenylphosphine, triphenylphosphine, tricyclohexylphosphine, diphenylbenzylphosphine, tri(p-tolyl)phosphine, tri(o-tolyl)phosphine, trinaphthylphosphine, and the like.

The use of the component (c) results in an increase in catalyst activity, which in turn increases the productivity, namely increases the ratio of the reactants to the component (a), facilitates the removal of the catalyst from the polymerization product; and enables the production of a less-colored polymer.

In carrying out the present process, although no particular restriction is placed on the method of preparing the catalyst, it is preferable to add a monomer to a mixture of (a) and (b) or a mixture of (a), (b) and (c) which has previously prepared in an inert solvent. Before the addition of the monomer, the activity of the catalyst can be further improved by ageing or heat treatment at a suitable temperature, preferably heat treatment at a temperature below the reaction temperature of the monomer or by exposure to a light of 200 to 700 nm in the presence or absence of the monomer.

In the present process, the amount of the catalyst component (a) used is 0.01 to 20, preferably 0.05 to 2 millimoles per mole of the total reactants. When the polymer having olefinic carbon-to-carbon double bond is used, each olefinic double bond in the polymer is counted as one mole. The amount of the component (b) used is 1 to 200 moles per mole of the component (a), and, if the component (c) is used, the amount of the component (b) is preferably 1 to 50, more preferably 2 to 20 moles per mole of the component (a). The amount of the component (c) used is usually 0.1 to 10, preferably 0.2 to 5 moles per mole of the component (a), though it may be varied depending upon the type of (c).

The polar-group-substituted norbornene derivatives used in this invention are, for example, compounds represented by the general formula,

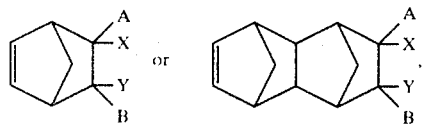

wherein A and B are hydrogen or hydrocarbon radicals having 1 to 10 carbon atoms; X and Y are hydrogen, hydrocarbon radicals having 1 to 10 carbon atoms, halogens, halohydrocarbon radicals having 1 to 10 carbon atoms, $-(CH_2)_nCOOR^1$, $-(CH_2)_nOCOR^1$, $-(CH_2)_nOR^1$, $-(CH_2)_nCN$, $-(CH_2)_nCONR^2R^3$, $-(CH_2)_nCOOZ$, $-(CH_2)_nOCOZ$, $-(CH_2)_nOZ$, $-(CH_2)_nT$, or

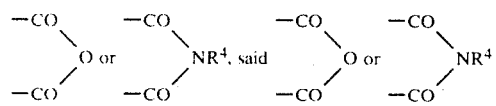

being formed from X and Y, and at least one of X and Y being a group other than hydrogen and the hydrocarbon radicals ($R^1$ is a hydrocarbon radical having 1 to 20 carbon atoms; $R^2$, $R^3$ and $R^4$ are hydrogen or hydrocarbon radicals having 1 to 20 carbon atoms; Z is a halogen-substituted hydrocarbon radical; and T is $SiR^5_pD_{3-p}$, wherein $R^5$ is a hydrocarbon radical having 1 to 10 carbon atoms, D is a halogen, $OCOR^5$, or $OR^5$, and p is 0 or an integer of 1 to 3).

Examples of such compounds are methyl 5-norbornene-2-carboxylate, ethyl 5-norbornene-2-carboxylate, phenyl 5-norbornene-2-carboxylate, methyl 2-methyl-5-norbornene-2-carboxylate, butyl 3-phenyl-5-norbornene-2-carboxylate, dimethyl 5-norbornene-2,3-dicarboxylate, cyclohexyl 5-norbornene-2-carboxylate, allyl 5-norbornene-2-carboxylate, 5-norbornene-2-yl acetate, 5-norbornene-2-nitrile, 3-methyl-5-norbornene-2-nitrile, 2,3-dimethyl-5-norbornene-2,3-dinitrile, 5-norbornene-2-carboxylic acid amide, N-methyl-5-norbornene-2-carboxylic acid amide, N,N-diethyl-5-norbornene-2-carboxylic acid amide, N,N,N',N'-tetramethyl-5-norbornene-2,3-dicarboxylic acid diamide, 5-chloro-2-norbornene, 5-methyl-5-chloro-2-norbornene, chloroethyl 5-norbornene-2-carboxylate, dibromopropyl 5-norbornene-2-carboxylate, dichloropropyl 5-norbornene-2-carboxylate, monochlorophenyl 5-norbornene-2-carboxylate, monobromophenyl 5-norbornene-2-carboxylate, tribromophenyl 5-norbornene-2-carboxylate, 2,3-dichloro-5-norbornene, 2-bromo-5-norbornene, 2-bromomethyl-5-norbornene, tribromobenzyl 5-norbornene-2-carboxylate, 5-norbornene-2,3-dicarboxylic anhydride, 2,3-dimethyl-5-norbornene-2,3-dicarboxylic anhydride, 5-norbornene-2,3-dicarboxylic acid imide, N-phenyl-2-methyl-5-norbornene-2,3-dicarboxylic acid imide, 2-trichlorosilyl-5-norbornene, 2-(dimethylmethoxysilyl)-5-norbornene, 2-(dimethylacetylsilyl)-5-norbornene, 2-trimethylsilyl-5-norbornene and the like.

Examples of the compounds represented by the general formula,

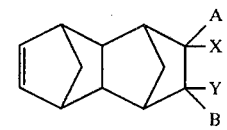

include 2-cyano-1,2,3,4,4a,5,8,8a-octahydro-1,4;5,8-dimethanonaphthalene, 2-carbomethoxy-1,2,3,4,4a,5,8,-8a-octahydro-1,4;5,8-dimethanonaphthalene, 2-chloro-1,2,3,4,4a,5,8,8a-octahydro-1,4;5,8-dimethanonaphthalene, and the like.

Further, by using a mixture of such a polar-group-substituted norbornene derivative and a cycloalkene having no polar substituent and/or a polymer having olefinic carbon-to-carbon double bonds, it is also possible to obtain a copolymer of these compounds.

Suitable cycloalkenes having no polar substituent include compounds represented by, for example, the general formula,

wherein Z represents a hydrocarbon radical having neither conjugated double bond nor triple bond, such as $-(CR^5_2)_a-$ and $-(CR^5_2)_b-CR^6=CR^7-(CR^8_2)_c-$ wherein a, b, and c are integers which satisfy the following conditions: $a \geq 1$ (including the case $a = 4$), $b \geq 1$, $c \geq 1$, and $b + c \geq 3$. Other suitable cycloalkenes are those having a polycyclo structure. In the case of bicycloalkenes, Z in the aforementioned formula represents a hydrocarbon radical of the formula,

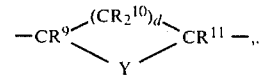

wherein Y represents $-(CR^{12}_2)_e-$ or $-(CR^{13}_2)_f-CR^{14}=CR^{15}-(CR^{16}_2)_g-$ where d, e, f, and g are integers which satisfy the following conditions: $d \geq 0$, $e \geq 0$, $d + e \geq 1$, $f \geq 0$, and $g \geq 0$. In the above formulas, $R^5$ to $R^{16}$ are hydrogen or hydrocarbon radicals such as alkyl, aryl, alkenyl, aralkyl, and the like; in the above formulas, it is not always necessary that two groups each of $R^5$, $R^8$, $R^{10}$, $R^{12}$, $R^{13}$ and $R^{16}$ are the same.

Examples of suitable cycloalkenes having no polar substituent include cyclobutene, cyclopentene, cycloheptene, cyclooctene, cyclononene, cyclodecene, cycloundecene, cyclododecene, cyclooctadecene, 1,5-cyclooctadiene, 1,5,9-cyclododecatriene, norbornene, norbornadiene, 3-methylcyclopentene, 4-methylcyclopentene, 5-methylnorbornene, 5-vinyl-2-norbornene, tetrahydroindene, dicyclopentadiene, 1,2,3,4,4a,5,8,8a-octahydro-1,4;5,8-dimethanonaphthalene, and the like.

Typical examples of the polymers having olefinic carbon-to-carbon double bonds include polybutadiene, styrene-butadiene copolymer, acrylonitrile-butadiene copolymer, polychloroprene, polyisoprene, natural rubber, ethylene-propylene-diene terpolymer, polyalkenamer, butyl rubber and the like. These polymers may be of the liquid, rubbery, or resinous nature.

Although the amount of the above cycloalkenes having no polar substituent and/or polymers having olefinic carbon-to-carbon double bonds is subject to no particular restriction, it is usually 0 to 95%, preferably 0–50% by weight based on the total weight of the above components and the polar-group-substituted norbornen derivatives.

The present process can be carried out in the presence or absence of a solvent. Suitable solvents include hydrocarbons such as hexane, heptane, benzene, toluene, cyclohexane, and the like; halohydrocarbons such as chlorobenzene, dichloromethane, 1,2-dichloroethane, chloroform, tetrachloroethylene, trichloroethylene, and the like; ethers such as diethyl ether, dibutyl ether, diphenyl ether, tetrahydrofuran, and the like; and mixtures thereof. Other solvents which will not deactivate the catalyst or its components for the present reaction may also be used. The temperature suitable for carrying out the present process is in the range of $-30°$ to $200°$ C., preferably $10°$ to $150°$ C.

The molecular weights of the polymers (or copolymers) produced by the present process can be controlled by the proper selection of type and concentration of the catalyst, polymerization temperature, type and quantity of the solvent, and concentration of the monomer, but more effectively by adding to the reaction system a proper amount of the compounds having in their molecules at least one carbon-to-carbon double bond or triple bond, such as α-olefins, α,ω-diolefins, or acetylenes, or of the polar allyl compounds such as allyl chloride, allyl acetate, trimethylallyloxysilane and the like. The addition of such a compound permits of controlling the molecular weight without substantially affecting the yield of the polymer and other properties such as microstructure of the polymer.

Polymerization of the monomer is effected at any concentration, though it is preferably 0.1% by weight or more. The present process is carried out either in a batch system or in a continuous manner. The polymerization is allowed to proceed preferably under an inert atmosphere such as nitrogen, argon, helium, or carbon dioxide. Before use, the monomer and solvent are preferably dehydrated and/or deaerated and, if necessary, may be treated with a titanium halide to remove impurities.

The polymer formed by the present process can be recovered from the polymerization mixture in a known manner such as by the addition of a nonsolvent such as a lower alcohol, for example, ethanol, methanol or the like, by steam crumbing, or by direct solvent removal using a vent type extruder. The polymer thus obtained can be stabilized by incorporating a known antioxidant such as, for example, 2,6-di-tert-butyl-4-methylphenol, 2,2'-dioxy-3,3'-di-tert-butyl-5,5'-dimethyldiphenylmethane, phenyl-β-naphthylamine, or the like.

The invention is illustrated below in further detail with reference to Examples, which are not by way of limitation, but by way of illustration.

EXAMPLE 1

To a thoroughly washed and dried 50-ml glass ampoule, which had been flushed with nitrogen, were added under a nitrogen stream 1 ml (0.05 mmole W compound) of a solution of 0.05 mole/liter of $(CO)_5W$-$C(OC_2H_5)C_6H_5$ [prepared from $W(CO)_6$, PhLi, and $Et_3OBF_4$ in a known manner] in n-heptane and 0.125 ml (0.25 mmole Ti compound) of a 2 moles/liter solution of titanium tetrachloride in n-heptane. After thoroughly blending the above mixture and subsequently adding 7.9 g of methyl 5-norbornene-2-carboxylate, the ampoule was sealed and shaken in a thermostat at 70° C. for 17 hours to allow the reaction to proceed. After the completion of the reaction, the solidified reaction mixture was discharged into methanol containing a small amount of 2,6-di-tert-butyl-4-methylphenol (antioxidant) and allowed to stand for 24 hours. Then, the polymer was washed thoroughly with methanol and dried overnight at 40° C. under reduced pressure to obtain 7.89 g (100% yield) of a pale brown resinous product.

This product had an intrinsic viscosity of 1.8 dl/g, as measured in toluene at 30° C. The infrared absorption spectrum and NMR spectrum showed the formation of a ring-opened polymer (I):

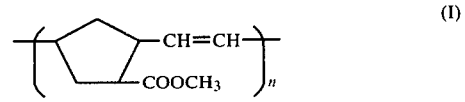

This polymer was completely dissolved in toluene, and no gel formation was noticed.

EXAMPLE 2

Polymerization was conducted under the same conditions as in Example 1, except that 15 ml of 1,2-dichloroethane (solvent) was added after the methyl 5-norbornene-2-carboxylate had been added. The yield of a white resinous polymer was 7.90 g (100% yield).

EXAMPLE 3

Polymerization was conducted under the same conditions as in Example 1, except that 0.2 ml (0.01 mmole) of the $(CO)_5WC(OC_2H_5)C_6H_5$ solution and 0.5 ml (0.05 mmole) of a 0.1 mole/liter solution of titanium tetrachloride in n-heptane were used. The yield of polymer was 7.88 g (100% yield).

EXAMPLE 4

The procedure of Example 3 was repeated, except that the amount of the $(CO)_5WC(OC_2H_5)C_6H_5$ solution used and the amount of the titanium tetrachloride solution used were 0.1 ml and 0.25 ml, respectively. The polymer yield was 3.4 g (45% yield).

EXAMPLE 5

The procedure of Example 3 was repeated, except that 0.2 ml (0.01 mmole) of a 0.05 mole/liter solution of [(CO)$_5$WCOC$_6$H$_5$][(CH$_3$)$_4$N] in dichloromethane was used in place of the solution of (CO)$_5$WC(OC$_2$H$_5$)C$_6$H$_5$. The yield of polymer was 2.90 g (39% yield).

EXAMPLE 6

To a 50-ml glass ampoule, which had been treated in the same manner as in Example 1, was added 1 ml (0.05 mmole) of a 0.05 mole/liter solution of [(CO)$_5$WCOC$_6$H$_5$][(CH$_3$)$_4$N] in dichloromethane, followed by adding thereto 0.125 mole (0.25 mmole) of a 2 moles/liter solution of titanium tetrachloride in n-heptane. To the mixture, after having been thoroughly blended, was added 6 g of 5-norbornene-2-nitrile. The ampoule was then sealed and shaken in a thermostat at 100° C. for 15 hours to allow the reaction to proceed. After the completion of the reaction, the polymer formed was separated from the reaction mixture in a similar manner to that in Example 1. The yield of a white resinous product was 2.15 g (36% yield). This polymer was soluble in chloroform and was confirmed to be a ring-opened polymer (II) by the infrared absorption spectrum and the NMR spectrum:

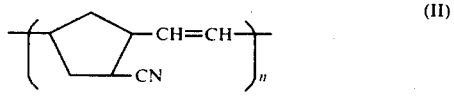
(II)

The glass transition point (Tg) of this polymer was 141° C., as measured by a differential scanning calorimeter (DSC).

EXAMPLE 7

Polymerization was carried out in the same way as in Example 6, except that after the addition of the 5-norbornene-2-nitrile, 15 ml of 1,2-dichloroethane was added. The yield of a white resinous polymer soluble in chloroform was 1.6 g (26% yield).

EXAMPLE 8

The procedure of Example 6 was repeated, except that 1 ml of a 0.05 mole/liter solution of (CO)$_5$WC(OC$_2$H$_5$)C$_6$H$_5$ in n-heptane was used in place of the [(CO)$_5$WCOC$_6$H$_5$][(CH$_3$)$_4$N] solution. The yield of the polymer was 0.84 g (14% yield).

EXAMPLE 9

Polymerization was conducted under the same conditions as in Example 6, except that before the addition of 5-norbornene-2-nitrile, the catalyst mixture was allowed to react at 70° C. for 1 hour. The yield of the polymer was 2.88 g (48% yield).

EXAMPLES 10 to 13

To a 50-ml glass ampoule, which had been treated in the same manner as in Example 1, were added 1 ml of a 0.05 mole/liter solution of [(CO)$_5$WCOC$_6$H$_5$][(CH$_3$)$_4$N] in dichloromethane and an amount as shown in Table 1 of a 2 moles/liter solution of titanium tetrachloride in n-heptane. After the catalyst components had been allowed to react at 70° C. for 1 hour, 6 g of 5-norbornene-2-nitrile was added to the ampoule. The ampoule was sealed and shaken in a thermostat at 70° C. for 15 hours to allow the reaction to proceed. After the completion of the reaction, a polymer was recovered in the same manner as in Example 1. The yields and percentage yields of polymers were as shown in Table 1.

TABLE 1

| Example No. | Amount of titanium tetrachloride solution used (ml) | TiCl$_4$ (mmole) | Molar ratio Ti/W | Yield of polymer (g) | (%) |
| --- | --- | --- | --- | --- | --- |
| 10 | 0.05 | 0.10 | 2 | 1.26 | 21 |
| 11 | 0.125 | 0.25 | 5 | 2.57 | 43 |
| 12 | 0.25 | 0.50 | 10 | 1.47 | 24 |
| 13 | 0.375 | 0.75 | 15 | 1.12 | 19 |

EXAMPLE 14

Polymerization was carried out in the same manner as in Example 11, except that the reaction between [(CO)$_5$WCOC$_6$H$_5$][(CH$_3$)$_4$N] and titanium tetrachloride was conducted at room temperature (25° C.) for 3 hours. The yield of the polymer was 2.79 g (47% yield).

EXAMPLE 15

After [(CO)$_5$WCOC$_6$H$_5$][(CH$_3$)$_4$N] and titanium tetrachloride had been charged in the same manner as in Example 6, the ampoule was exposed at 15° C. for 1.5 hours to rays from a 150-W point-source xenon lamp at a distance of 7.5 cm. Thereafter, 6 g of 5-norbornene-2-nitrile was introduced into the ampoule, which was then sealed. The ampoule was shaken in a thermostat at 70° C. for 15 hours to allow the reaction to proceed. After the completion of the reaction, the polymer was separated in the same way as in Example 1. The yield of the polymer was 2.64 g (44% yield).

The polymer thus obtained was soluble in chloroform and had an intrinsic viscosity of 1.38 dl/g, as measured in chloroform at 30° C. It was confirmed to be a ring-opened polymer by the infrared absorption spectrum and NMR spectrum.

EXAMPLE 16

The procedure of Example 15 was repeated, except that after the addition of the 5-norbornene-2-nitrile, 0.5 ml (0.25 mmole) of a 0.5 mole/liter solution of 1-hexene in n-heptane was added. The yield of the polymer was 2.58 g (43% yield) and the polymer showed an intrinsic viscosity of 0.63 dl/g, as measured in chloroform at 30° C.

EXAMPLE 17

To a 50-ml glass ampoule, which has been treated as in Example 1, were added 1 ml of a 0.05 mole/liter solution of (CO)$_5$WC(OC$_2$H$_5$)C$_6$H$_5$ in n-heptane 7.9 g of methyl 5-norbornene-2-carboxylate, and 3.4 g of cyclopentene in this order. After further addition of 0.125 ml of a 2 moles/liter solution of titanium tetrachloride in n-heptane, the ampoule was sealed and shaken in a thermostat at 70° C. for 14 hours to allow the reaction to proceed. After the completion of the reaction, the resulting polymer was recovered in the same manner as in Example 1 to obtain 11.1 g (98% yield) of a polymer. The polymer was confirmed to contain both the monomers as structural units by the infrared absorption spectrum and NMR spectrum. 2 g of the polymer was extracted in a Soxhlet extractor with 30 ml of n-heptane for 6 hours to obtain 0.2 g of a n-heptane-soluble portion and 1.8 g of a n-heptaneinsoluble portion, both containing both monomers as structural units. From the fact that a homopolymer of methyl 5-norbornene-2-carboxylate is insoluble in n-heptane and a homopolymer of cyclopentene is soluble in n-heptane, it is evident that the above polymer was a copolymer.

EXAMPLE 18

Into a 100-ml glass ampoule, which had been treated as in Example 1, were introduced under a nitrogen stream 4 ml of a 0.05 mole/liter solution of [(CH$_3$)$_4$N][(CO)$_5$WCOC$_6$H$_5$] in dichloromethane and 0.5 ml of a 2 moles/liter solution of titanium tetrachloride in n-heptane. The mixture was allowed to stand at room temperature for 5 minutes. To the ampoule were then added 12 g of 5-norbornene-2-nitrile and 22 ml of a 0.054 g/ml solution in 1,2-dichloromethane of a styrenebutadiene copolymer (23.5% bound styrene; ML$_{1+4}$(100° C.)=52) which had been purified by toluene-methanol reprecipitation. The ampoule was sealed and shaken in a thermostat at 100° C. for 15 hours to allow the reaction to proceed. After the completion of the reaction, the resulting polymer was recovered in the same way as in Example 1 to obtain 0.99 g (15% yield based on the sum of 5-norbornene-2-nitrile and styrenebutadiene copolymer) of a pale brown resinous product. This product was soluble in chloroform and tetrahydrofuran and found to be a ring-opened polymer of 5-norbornene-2-nitrile containing units of styrene and butadiene, as evidenced by the infrared absorption spectrum. The glass transition point (Tg) of the polymer was 139° C., as measured with DSC.

EXAMPLE 19

Into a 50-ml glass ampoule, which had been treated as in Example 1, were introduced under a nitrogen stream 1 ml of a 0.05 mole/liter solution of [(CH$_3$)$_4$N][(CO)$_5$WCOC$_6$H$_5$] in dichloromethane and 0.25 ml of a 1 mole/liter solution of titanium tetrachloride in n-heptane. The mixture was allowed to stand at room temperature for 5 minutes. Then, 7.5 g of 5-chloromethyl-2-norbornene was added to the mixture. Polymerization commenced instantly and in several minutes the reaction mixture solidified. The ampoule was sealed and kept in a thermostat at 70° C. for 23 hours to allow the reaction to continue. After the completion of the reaction, the polymer was recovered in the same manner as in Example 1 to obtain 7.5 g (100% yield) of a white resinous polymer.

EXAMPLE 20

Into a 50-ml glass ampoule, which had been treated as in Example 1, were introduced under a nitrogen stream 2 ml of a 0.05 mole/liter solution of [(CH$_3$)$_4$N][(CO)$_5$WCOC$_6$H$_5$] in dichloromethane and 0.5 ml of a 1 mole/liter of solution of titanium tetrachloride in n-heptane. The mixture was allowed to stand at room temperature for 10 minutes. After the addition of 6.6 g of N,N-dimethyl-5-norbornene-2-carboxylic acid amide, the ampoule was sealed and shaken in a thermostat at 100° C., for 19 hours to allow the reaction to proceed. After the completion of the reaction, the reaction mixture was poured into petroleum ether containing a small amount of an antioxidant and methanol, and allowed to stand overnight. The precipitated polymer was collected by filtration and dried at 40° C. under reduced pressure to obtain 1.8 g (27% yield) of a product. It was confirmed by the infrared absorption spectrum that this product was a ring-opened polymer.

COMPARATIVE EXAMPLE 1

The procedure of Example 6 was repeated, except that 0.5 ml of a 1 mole/liter solution of ethylaluminum dichloride in toluene. The yield of the polymer was 0.12 g (2% yield).

COMPARATIVE EXAMPLE 2

The procedure of Comparative Example 1 was repeated, except that 1.5 ml of the ethylaluminum dichloride solution was used. The yield of a polymer was 0.25 g (4% yield).

EXAMPLE 21

To a thoroughly washed and dried 100-ml glass ampoule, which had been flushed with nitrogen, were added under a nitrogen stream 0.2 ml (0.01 mmole) of a 0.05 mole/liter solution of (CO)$_5$WC(OC$_2$H$_5$)C$_6$H$_5$ [prepared from W(CO)$_6$, PhLi, and Et$_3$OBF$_4$ in a known way] in n-heptane, 0.5 ml (0.05 mmole) of a 0.1 mole/liter solution of TiCl$_4$ in n-heptane, and 0.05 ml of a suspension of 10 mmoles of p-benzoquinone in 100 ml of n-heptane. After through mixing, the mixture was allowed to stand at room temperature for 10 minutes. To the mixture was then added 15.2 g of methyl 5-norbornene-2-carboxylate. The ampoule was sealed and shaken in a thermostat at 70° C. for 15 hours to allow the reaction to proceed. After the completion of the reaction, the solidified reaction mixture was dissolved in chloroform and introduced into methanol containing a small amount of 2,6-di-tertbutyl-4-methylphenol (antioxidant). The precipitated polymer was collected by filtration, washed with methanol, and dried overnight at 40° C. under reduced pressure to obtain 8.8 g (58% yield) of a white resinous product.

The above product had an intrinsic viscosity of 2.3 dl/g, as measured in toluene at 30° C. Comparing the infrared absorption spectrum and NMR spectrum of the product with those of a methyl 5-norbornene-2-carboxylate polymer prepared by a known procedure, it was found that the present product was a ring-opened polymer (I):

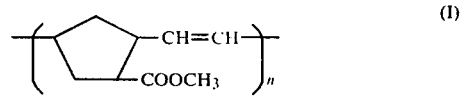
(I)

The glass transition point (Tg) of this polymer was 61° C., as measured with DSC. It was completely soluble in toluene without showing gel formation.

EXAMPLE 22

The procedure of Example 21 was repeated, except that the amount of methyl 5-norbornene-2-carboxylate used was 7.6 g and 0.05 ml of a suspension of 10 mmoles of anthraquinone in 100 ml of n-heptane was used in place of the p-benzoquinone dispersion. There were obtained 7.6 g (100% yield) of a faintly yellowish resinous polymer.

EXAMPLE 23

The procedure of Example 22 was repeated, except that the suspension of anthraquinone in n-heptane was used in an amount of 0.15 ml. The yield of polymer was 7.4 g (97% yield).

EXAMPLE 24

The procedure of Example 22 was repeated, except that 0.2 ml of a 0.05 mole/liter solution of [(CH$_3$)$_4$N][(CO)$_5$WCOC$_6$H$_5$] in dichloromethane was used in place of the (CO)$_5$WC(OC$_2$H$_5$)C$_6$H$_5$ solution. The yield of the polymer was 2.8 g (37% yield).

EXAMPLE 25

Into a 50-ml glass ampoule, which had been treated as in Example 21, were charged 1 ml of a 0.05 mole/liter solution of [(CH$_3$)$_4$N][(CO)$_5$WCOC$_6$H$_5$] in dichloromethane 0.15 ml of a mixture of 10 mmoles of anthraquinone and 100 ml of n-heptane, and 0.25 ml of a 1 mole/liter solution of TiCl$_4$ in n-heptane. After thorough mixing, the mixture was allowed to stand at room temperature for 5 minutes. To the ampoule was then added 6 g of 5-norbornene-2-nitrile. The ampoule was sealed and shaken in a thermostat at 70° C. for 19 hours to allow the reaction to proceed. After the completion of the reaction, the contents of the ampoule were discharged into methanol containing a small amount of 2,6-di-tert-butyl-4-methylphenol and allowed to stand at room temperature for 24 hours. The polymer was then washed thoroughly with methanol and dried overnight at 50° C. under reduced pressure to obtain 2.8 g (48% yield) of a faintly yellowish resinous product.

The above product had an intrinsic viscosity of 0.93 dl/g, as measured in chloroform at 30° C. Comparing the infrared absorption spectrum and NMR spectrum of the product with those of a 5-norbornene-2-nitrile polymer prepared in a known manner, it was found that the present polymer was a ring-opened polymer (II):

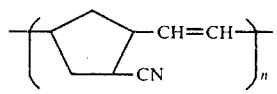
(II)

The glass transition point (Tg) of the polymer was 140° C., as measured with DSC. The polymer was completely soluble in chloroform and acetone, and no gel formation was noticed.

EXAMPLE 26

The procedure of Example 25 was repeated, except that the mixture of anthraquinone and n-heptane was used in an amount of 0.25 ml. The result obtained was as shown in Table 2.

EXAMPLE 27

The procedure of Example 25 was repeated, except that the mixture of anthraquinone and n-heptane was used in an amount of 0.75 ml. The result obtained was as shown in Table 2.

EXAMPLE 28

The procedure of Example 25 was repeated, except that the mixture of anthraquinone and n-heptane was used in an amount of 1 ml. The result obtained was as shown in Table 2.

TABLE 2

| | Polymerization of 5-norbornene-2-nitrile. | | |
|---|---|---|---|
| Example No. | Amount of mixture of anthraquinone and n-heptane (ml) | Yield of polymer (%) | Intrinsic viscosity (dl/g) |
| 25 | 0.15 | 48 | 0.93 |
| 26 | 0.25 | 52 | — |
| 27 | 0.75 | 55 | 0.91 |
| 28 | 1.00 | 51 | — |

EXAMPLE 29

Into a 50-ml glass ampoule, which had been treated as in Example 21, were charged 6 g of 5-norbornene-2-nitrile and 12 ml of dehydrated and deaerated 1,2-dichloroethane, then followed by adding thereto 0.5 ml of a 0.1 mole/liter solution of TiCL$_4$ in n-heptane. The contents of the ampoule were thoroughly mixed. Into a 20-ml test tube, which had been dried and flushed with nitrogen, were introduced 5 ml of a 0.05 mole/liter solution of [(CH$_3$)$_4$N][(CO)$_5$WCOC$_6$H$_5$] in dichloromethane, 1.25 ml of the mixture of anthrquinone and n-heptane described in Example 25, and 1.25 ml of a 1 mole/liter solution TiCl$_4$ L in n-heptane. After thorough mixing, the test tube was allowed to stand at room temperature for 20 minutes. To the said ampoule was added 1 ml of the mixture in the test tube. The ampoule was then sealed and shaken in a thermostat at 70° C. for 19 hours to allow the reaction to proceed. After the completion of the reaction, the resulting polymer was recovered in the same manner as in Example 25 to obtain 2.8 g (46% yield) of a resinous polymer.

EXAMPLE 30

The procedure of Example 25 was repeated, except that 0.25 ml of a mixture of 10 mmoles of p-benzoquinone and 100 ml of n-heptane was used in place of the mixture of anthraquinone and n-heptane. A polymer was obtained in a yield of 2.6 g (43%).

EXAMPLE 31

The procedure of Example 25 was repeated, except that 0.25 ml of a mixture of 10 mmoles of maleic anhydride and 100 ml of n-heptane was used in place of the mixture of anthraquinone and n-heptane. The yield of the polymer was 1.7 g (29%).

EXAMPLE 32

The procedure of Example 31 was repeated, except that the mixture of maleic anhydride and n-heptane was used in an amount of 0.75 ml. The yield of the polymer was 1.4 g (23%).

EXAMPLE 33

The procedure of Example 25 was repeated, except that 0.25 ml of a mixture of 10 mmoles of tetracyanoethylene and 100 ml of n-heptane was used in place of the mixture of anthraquinone and n-heptane. The yield of the polymer was 1.2 (20%).

EXAMPLE 34

The procedure of Example 25 was repeated, except that 0.75 ml of a 0.1 mole/liter solution of nitrobenzene in n-heptane was used in place of the mixture of anthraquinone and n-heptane. The yield of the polymer was 1.1 g (18%).

EXAMPLE 35

The procedure of Example 25 was repeated, except that a mixture of 10 mmoles of chloranil and 100 ml of n-heptane was used in place of the mixture of anthraquinone and n-heptane. The yield of the polymer was 2.3 g (38%).

EXAMPLE 36

The procedure of Example 25 was repeated, except that 0.25 ml of a 0.1 mole/liter solution of nitrosobenzene in toluene was used in place of the mixture of anthraquinone and n-heptane. The yield of the polymer was 1.3 g (22%).

EXAMPLE 37

The procedure of Example 25 was repeated, except that the mixture of anthraquinone and n-heptane was not used. There was obtained 0.73 g (12% yield) of a polymer having an intrinsic viscosity of 0.49 dl/g, as measured in chloroform at 30° C.

EXAMPLE 38

The procedure of Example 29 was repeated, except that 6 g of 2-methyl-5-norbornene-2-nitrile was used in place of the 5-norbornene-2-nitrile. There were obtained 2.1 g (35% yield) of a pale yellow resinous polymer having a glass transition point (Tg) of 153° C., as measured with DSC.

EXAMPLE 39

To a 100-ml glass ampoule, which had been treated as in Example 21, were added under a nitrogen stream 1 ml (0.05 mmole) of a 0.05 mole/liter solution of $(CO)_5W-C(OC_2H_5)C_6H_5$ in n-heptane, 0.15 ml of the mixture of anthraquinone and n-heptane described in Example 25, and 0.25 ml of a 1 mole/liter solution of $TiCl_4$ in n-heptane. After thorough mixing, the mixture was allowed to stand at room temperature for 10 minutes. To the ampoule were then added 7.6 g of methyl 5-norbornene-2-carboxylate and 3.4 L g of cyclopentene. The ampoule was sealed and shaken in a thermostat at 70° C. for 17 hours to allow the reaction to proceed. After the completion of the reaction, the resulting polymer was recovered in the same manner as in Example 25 to obtain 10.9 g (99% yield) of a polymer.

It was found from the infrared spectrum and NMR spectrum that the polymer cotained above contains both the monomers as structural units. The formation of a copolymer was confirmed by a thin layer chromatography using silica gel as a carrier and benzene as a developer.

EXAMPLE 40

The procedure of Example 39 was repeated, except that 55 ml of a 800 g/liter solution of tribromophenyl 5-norbornene-2-carboxylate in toluene was used in place of the mixture of methyl 5-norbornene-2-carboxylate and cyclopentene. There was obtained 32 g (73% yield) of a polymer in white powder form.

EXAMPLE 41

To a 50-ml glass ampoule, which had been thoroughly washed, dried and flushed with nitrogen, were added under a nitrogen stream 1 ml (0.05 mmole) of a 0.05 mole/liter solution of $[(CH_3)_4N][(CO)_5WCOC_6H_5]$ in dichloromethane, 0.25 ml (0.25 mmole) of a 1mole/liter solution of $TiCl_4$ in n-heptane, and 0.5 ml (0.05 mmole) of a solution of 10 mmoles of triphenylphosphine in 100 ml of n-heptane. After thorough mixing, the mixture was allowed to stand at room temperature for 10 minutes. To the ampoule was then added 5.95 g of 5-norbornene-2-nitrile. The ampoule was sealed and shaken in a thermostat at 70° C. for 19 hours to allow the reaction to proceed. After the completion of the reaction, the contents of the ampoule were poured into methanol containing a small amount of 2,6-di-tert-butyl-4-methylphenol and allowed to stand at room temperature for 24 hours. Thereafter, the resulting polymer was washed thoroughly with methanol and dried at 50° C. overnight under reduced pressure to obtain 5 g (84% yield) of a faintly yellowish resinous product having an intrinsic viscosity of 0.71 dl/g, as measured in chloroform at 30° C. Comparing the infrared absorption spectrum and NMR spectrum with those of a 5-norbornene-2-nitrile polymer prepared in a known manner, it was found that this product was a ring-opened polymer (II):

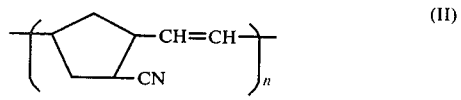

The glass transition point (Tg) was 141° C., as measured with DSC. The polymer was completely soluble in toluene, and no gel formation was noticed. The yield was as shown in Table 3 in which the results obtained in Examples 41, 42, and 44 are also shown.

EXAMPLE 42

The procedure of Example 41 was repeated, except that the 0.1 mole/liter solution of triphenylphosphine in n-heptane was used in an amount of 0.25 ml (0.025 mmole). The result obtained was as shown in Table 3.

EXAMPLE 43

The procedure of Example 41 was repeated, except that the 0.1 mole/liter solution of triphenylphosphine in n-heptane was used in an amount of 0.75 ml (0.075 mmole). The result obtained was as shown in Table 3.

EXAMPLE 44

The procedure of Example B 41 was repeated, except that the 0.1 mole/liter solution of triphenylphosphine in n-heptane was 1.0 ml (0.1 mmole). The result obtained was as shown in Table 3.

TABLE 3

| | Polymerization of 5-norbornene-2-nitrile. | | |
|---|---|---|---|
| Example No. | Amount of triphenyl-phosphine solution (ml) | Yield of polymer (%) | Intrinsic viscosity (dl/g) |
| 42 | 0.25 | 78 | — |
| 41 | 0.5 | 84 | 0.71 |
| 43 | 0.75 | 70 | — |
| 44 | 1.0 | 60 | — |

EXAMPLE 45

The procedure of Example 41 was repeated, except that 0.25 ml (0.025 mmole) of a suspension of 10 mmoles of dimethyl sulfoxide in 100 ml of n-heptane was used in place of the triphenylphosphine solution. The result obtained was as shown in Table 4.

EXAMPLE 46

The procedure of Example 45 was repeated, except that the suspension of dimethyl sulfoxide in n-heptane was used in an amount of 0.5 ml (0.05 mmole). The result obtained was as shown in Table 4.

EXAMPLE 47

The procedure of Example 45 was repeated, except that the suspension of dimethyl sulfoxide in n-heptane was used in an amount of 0.75 ml (0.075 mmole). The result obtained was as shown in Table 4.

EXAMPLE 48

The procedure of Example 45 was repeated, except that the suspension of dimethyl sulfoxide in n-heptane was used in an amount of 1.5 ml (0.15 mmole). The result obtained was as shown in Table 4.

TABLE 4

| Example No. | Amount of suspension of $(CH_3)_2SO$ (ml) | Yield of polymer (%) |
|---|---|---|
| 45 | 0.25 | 26 |
| 46 | 0.5 | 33 |
| 47 | 0.75 | 45 |
| 48 | 1.5 | 35 |

EXAMPLE 49

The procedure of Example 41 was repeated, except that 0.3 ml (0.03 mmole) of a solution of 10 mmoles of di-tert-butyl sulfide in 100 ml of n-heptane (0.1 mole per liter of n-heptane) was used in place of the triphenylphosphine solution. The result obtained was as shown in Table 5.

EXAMPLE 50

The procedure of Example 49 was repeated, except that the solution of di-tert-butyl sulfide was used in an amount of 0.5 ml (0.05 mmole). The result obtained was as shown in Table 5.

EXAMPLE 51

The procedure of Example 49 was repeated, except that the solution of di-tert-butyl sulfide was used in an amount of 1.5 ml (0.15 mmole). The result obtained was as shown in Table 5.

TABLE 5

| Example No. | Amount of di-tert-butyl sulfide solution (ml) | Yield of polymer (%) |
|---|---|---|
| 49 | 0.3 | 36 |
| 50 | 0.5 | 26 |
| 51 | 1.5 | 19 |

EXAMPLE 52

The procedure of Example 41 was repeated, except that 0.25 ml (0.025 mmole) of a solution of 10 mmoles of triethylphosphine in 100 ml of n-heptane (0.1 mole per liter of n-heptane) was used in place of the solution of triphenylphosphine. The yield of the polymer was 2.1 g (36%).

EXAMPLE 53

The procedure of Example 43 was repeated, except that 1 ml of a 0.05 mole/liter solution of $(CO)_5W\text{-}C(OC_2H_5)C_6H_5$ in n-heptane was used in place of the solution of $[(CH_3)_4N][(CO)_5WCOC_6H_5]$. The yield of the polymer was 1 g (17%).

EXAMPLE 54

Into a 50-ml glass ampoule, which had been treated as in Example 41, were introduced 0.2 ml (0.01 mmole) of a 0.05 mole/liter solution of $(CO)_5WC(OC_2H_5)C_6H_5$ in n-heptane, 0.5 ml (0.05 mmole) of a 0.1 mole/liter solution of $TiCl_4$ in n-heptane, and 0.1 ml (0.01 mmole) of a 0.1 mole/liter solution of triphenylphosphine in n-heptane. After thorough mixing, the mixture was allowed to stand at room temperature for 10 minutes. To the ampoule was then added 7.6 g of methyl 5-norbornene-2-carboxylate. The ampoule was sealed and shaken in a thermostat at 70° C., for 19 hours to allow the reaction to proceed. After the completion of the reaction, the solidified reaction product was dissolved in chloroform and poured into methanol containing a small amount of 2,6-di-tert-butyl-4-methylphenol. The resulting mixture was allowed to stand at room temperature for 24 hours. Thereafter, the resulting polymer was washed thoroughly with methanol and then dried overnight at 40° C. under reduced pressure to obtain 7.6 g (100% yield) of a white resinous product.

The above product had an intrinsic viscosity of 4.6 dl/g, as measured in toluene at 30° C. Comparing the infrared spectrum and NMR spectrum with those of a methyl 5-norbornene-2-carboxylate polymer prepared in a known manner, it was found that this product was a ring-opened polymer (I):

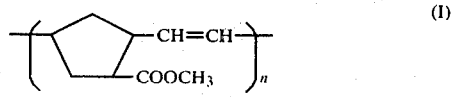

The glass transition point (Tg) of the polymer was 61° C., as measured with DSC. The polymer was completely soluble in toluene, and no gel formation was noticed.

EXAMPLE 55

The procedure of Example 54 was repeated, except that the triphenylphosphine solution was used in an amount of 0.2 ml (0.02 mmole). The yield of the polymer was 6.2 g (82%).

EXAMPLE 56

The procedure of Example 54 was repeated, except that 0.1 ml (0.01 mmole) of a 0.1 mole/liter solution of di-tert-butyl sulfide in n-heptane was used in place of the solution of triphenylphosphine. The yield of the polymer was 6.8 g (90%).

EXAMPLE 57

The procedure of Example 41 was repeated, except that 6 g of 2-methyl-5-norbornene-2-nitrile was used in place of the 5-norbornene-2-nitrile. There was obtained 4.6 g (77% yield) of a pale yellow resinous polymer having a glass transition point (Tg) of 153° C., as measured with DSC.

EXAMPLE 58

The procedure of Example 47 was repeated, except that 14.2 g of 5-chloromethyl-2-norbornene was used in place of the 5-norbornene-2-nitrile. There was obtained 14.2 g (100% yield) of a white resinous product having a glass transition point (Tg) of 71° C., as measured with DSC.

EXAMPLE 59

Into a 100-ml glass ampoule, which had been treated as in Example 41, were charged under a nitrogen stream 1 ml (0.05 mmole) of a 0.05 mole/liter solution of $(CO)_5WC(OC_2H_5)C_6H_5$ in n-heptane, 0.3 ml of the di-tert-butyl sulfide solution in n-heptane described in Example 49, and 0.25 ml of a 1 mole/liter solution of $TiCl_4$ in n-heptane. After thorough mixing, the mixture was allowed to stand at room temperature for 10 minutes.

To the above mixture were added 7.6 g of methyl 5-norbornene-2-carboxylate and 3.4 g of cyclopentene. The ampoule was sealed and shaken in a thermostat at 70° C. for 17 hours to allow the reaction to proceed. After the completion of the reaction, the resulting polymer was recovered in the same manner as in Example 54 to obtain 10.9 g (99% yield) of a polymer. From the infrared absorption spectrum and NMR spectrum, this polymer was found to contain both the monomers as structural units. On thin layer chromatographic analysis using silica gel as a carrier and benzene as a developer, the formation of a copolymer was confirmed.

EXAMPLE 60

The procedure of Example 41 was repeated, except that 0.25 ml (0.025 mmole) of a suspension of 10 mmoles of N-chlorosuccinic acid imide in 100 ml of n-heptane was used in place of the triphenylphosphine solution. The yield of the polymer was 4.7 g (78%).

EXAMPLE 61

The procedure of Example 60 was repeated, except that the suspension of N-chlorosuccinic acid imide in n-heptane was used in an amount of 0.5 ml (0.05 mmole). The yield of the polymer was 4.5 g (75%).

EXAMPLE 62

The procedure of Example 60 was repeated, except that the suspension of N-chlorosuccinic acid imide in n-heptane was 0.75 ml (0.075 mmole). The yield of the polymer was 3.7 g (62%).

EXAMPLE 63

Into a 50-ml glass ampoule, which was treated as in Example 41, were introduced 6 g of 5-norbornene-2-nitrile, 5 ml of 1,2-dichloroethane, and 10 ml of a solution of 6.4 g of a styrene-butadiene copolymer (23.5% bound styrene; $ML_{1+4}$ (100° C.)=52; purified by chloroform-methanol reprecipitation and dried at 40° C. for 24 hours under reduced pressure) in 100 ml of 1,2-dichloroethane, then followed by adding thereto 0.5 ml of a 0.1 mole/liter solution of $TiCl_4$ in n-heptane.

Into a 20-ml test tube, which had been dried and flushed with nitrogen, were introduced 5 ml of a 0.05 mole/liter solution of $[(CH_3)_4N][(CO)_5WCOC_6H_5]$ in dichloromethane, 1.5 ml of the suspension of N-chlorosuccinic acid imide in n-heptane described in Example 60, and 1.25 ml of a 1 mole/liter solution of $TiCl_4$ in n-heptane. After thorough mixing, the mixture was allowed to react at room temperature for 20 minutes. To the said ampoule was added 1 ml of this mixture. The ampoule was sealed and the reaction was allowed to proceed in the same manner as in Example 41 at 70° C. for 19 hours. After the completion of the reaction, the resulting polymer was recovered in the same manner as in Example 41 to obtain 2.7 g (41% yield) of a resinous polymer. From the infrared absorption spectrum, NMR spectrum, and thin layer chromatogram, it was found that this polymer contained in its molecular chain both the norbornenenitrile and the styrene-butadiene copolymer units. The glass transition point (Tg) of this polymer was 137° C., as measured with DSC.

EXAMPLE 64

The procedure of Example 63 was repeated, except that 2.5 ml of the triphenylphosphine solution described in Example 41 was used in place of the suspension of N-chlorosuccinic acid imide in n-heptane. The yield of the polymer was 2.1 g (32%).

EXAMPLE 65

The procedure of Example 54 was repeated, except that the $(CO)_5WC(OC_2H_5)C_6H_5$ solution, the triphenylphosphine solution, and the $TiCl_4$ solution were used in amounts of 0.4 ml, 0.2 ml, and 0.1 ml, respectively, and 28 ml of a 0.64 g/ml solution of tribromophenyl 5-norbornene-2-carboxylate in 1,2-dichloroethane was used in place of the methyl 5-norbornene-2-carboxylate. There was obtained 11.5 g (64% yield) of a pale yellow resinous polymer having a glass transition point of 130° C., as measured with DSC.

EXAMPLE 66

Into a 50-ml glass ampoule, which was treated as in Example 1, were introduced 0.3 ml (0.015 mmole) of a 0.05 mole/liter solution of $(CO)_5WC(OC_2H_5)C_6H_5$ in n-heptane, 7.9 g of methyl 5-norbornene-2-carboxylate, and 3.4 g of dimethano-1,4,5,8-octahydro-1,2,3,4,4a,5,8,-8a-naphthalene in this order, and 0.75 ml (0.075 mmole) of a 0.1 mole/liter solution of $TiCl_4$ in n-heptane was then added thereto, after which the ampoule was sealed, and the resulting mixture was subjected to reaction with stirring in a thermostat at 70° C. for 15 hours. After the reaction, the resulting polymer was treated in the same manner as in Example 1 to obtain 11.2 g (99.1% yield) of a white resinous product.

The glass transition point (Tg) of the polymer thus obtained was 367° K. (94° C.) as measured with DSC.

From the fact that the polymer had a single glass transition point and that said glass transition point is very well accorded with the Tg calculated from the following well-known equation concerning the relation between the copolymer composition and the glass transition point of the copolymer:

$$\frac{1}{Tg} = \frac{W_1}{Tg_1} + \frac{W_2}{Tg_2}$$

in which $Tg_1$ and $Tg_2$ are glass transition points as indicated in absolute temperature of pure homopolymers 1 and 2 of the monomers constituting the copolymer, respectively, and $W_1$ and $W_2$ are weight fractions of the components 1 and 2 constituting the copolymer, respectively, it was confirmed that the polymer obtained was a copolymer of methyl 5-norbornene-2-carboxylate and dimethano-1,4,5,8-octahydro-1,2,3,4,4a,5,8,8a-naphthalene.

What is claimed is:

1. A process for producing a polymer or copolymer of a norbornene derivative, which comprises contacting in the presence or absence of an inert solvent at least one norbornene derivative substituted by at least one polar group selected from the group consisting of ester, ether, nitrile, amide, imide, acid anhydride, halogen, and silyl, or by at least one substituent having said polar group; or a combination of said norbornene derivative with at least one member selected from the group consisting of cycloalkenes having no polar substituent and polymers having olefinic carbon-to-carbon double bonds, with a catalyst comprising (a) at least one coordination compound of W or Mo, the oxidation number of which is 2,1, or 0, (b) at least one titanium tetrahalide, and (c) at least one compound selected from the group consisting of N-halogen-substituted cyclic acid imides, sulfides, sulfoxides and phosphines.

2. A process according to claim 1, wherein the norbornene derivative is at least one compound represented by the general formula:

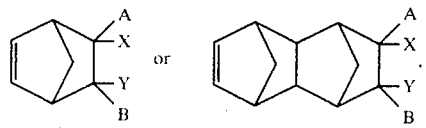

wherein A and B are hydrogen or hydrocarbon radicals having 1 to 10 carbon atoms and X and Y are hydrogen, hydrocarbon radicals having 1 to 10 carbon atoms, halogens, halohydrocarbon radicals having 1 to 10 carbon atoms, $-(CH_2)_n COOR^1$, $-(CH_2)_n OCOR^1$, $-(CH_2)_n OR^1$, $-(CH_2)_n CN$, $-(CH_2)_n CONR^2 R^3$, $-(CH_2)_n COOZ$, $-(CH_2)_n OCOZ$, $-(CH_2)_n OZ$, $-(CH_2)_n T$, or

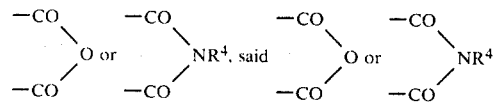

being formed from X and Y, at least one of said X and Y being a group other than hydrogen and the hydrocarbon radicals ($R^1$ is a hydrocarbon radical having 1 to 20 carbon atoms; $R^2$, $R^3$ and $R^4$ are hydrogen or hydrocarbon radicals having 1 to 20 carbon atoms; Z is a halohydrocarbon radical, and T is $-SiR^5{}_p D_{3-p}$ ($R^5$ is a hydrocarbon radical having 1 to 10 carbon atoms, D is a halogen, $OCOR^5$, or $OR^5$, and p is 0 or an integer of 1 to 3) and n is 0 or an integer of 1 to 10.

3. A process according to claim 2, wherein in the general formula, A and B are hydrogen, X is $-(CH_2)_n COOR^1$, $-(CH_2)_n OCOR^1$, $-(CH_2)_n CN$, $-(CH_2)_n CONR^2 R^3$, $-(CH_2)_n COOZ$, or $(CH_2)_n OCOZ$ ($R^1$, $R^2$, $R^3$, Z and n are as defined in claim 3) and Y is hydrogen or a hydrocarbon radical.

4. A process according to claim 1, wherein the norbornene derivative is at least one compound selected from the group consisting of methyl 5-norbornene-2-carboxylate, ethyl 5-norbornene-2-carboxylate, butyl 5-norbornene-2-carboxylate, phenyl 5-norbornene-2-carboxylate, methyl 2-methyl-5-norbornene-2-carboxylate, ethyl 3-methyl-5-norobornene-2-carboxylate, methyl 3-phenyl-5-norbornene-2-carboxylate, cyclohexyl 5-norbornene-2-carboxylate, 5-norbornene-2-yl acetate, chloroethyl 5-norobornene-2-carboxylate, dibromopropyl 5-norbornene-2-carboxylate, dichloropropyl 5-norbornene-2-carboxylate, monochlorophenyl 5-norobornene-2-carboxylate, monobromophenyl 5-norbornene-2-carboxylate, tribromophenyl 5-norbornene-2-carboxylate, tribromobenzyl 5-norbornene-2-carboxylate, 5-norobornene-2-nitrile, 2-methyl-5-norbornene-2-nitrile, 3-methyl-5-norbornene-2-nitrile, 3-phenyl-5-norbornene-2-nitrile, N,N-dimethyl-5-norbornene-2-carboxylic acid amide, N,N-diethyl-5-norbornene-2-carboxylic acid amide, N,N-diphenyl-5-norbornene-2-carboxylic acid amide, N,N-pentamethylene-5-norbornene-2-carboxylic acid amide, and N-phenyl-5-norbornene-2,3-carboxylic acid imide.

5. A process according to any claim 1, wherein the cycloalkene having no polar substituent is at least one compound selected from the group consisting of cyclobutene, cyclopentane, cycloheptene, cyclooctene, cyclodecene, cyclododecene, cyclohexadecene, 1,5-cyclooctadiene, 1,5,9-cyclododecatriene, norbornene, norbornadiene, cyclopentadiene, 3-methylcyclopentene, 4-methylcyclopentene, 5-methylnorbornene, 5-phenylnorbornene, tetrahydroindene, ethylidenenorbornene, 5-vinyl-2-norbornene, dicyclopentadiene, dihydrodicyclopentadiene, and 1,2,3,4,4a,5,8,8a-octahydro-1,4;5,8-dimethanonaphthalene.

6. A process according to claim 1 wherein the polymer having olefinic carbon-to-carbon double bonds is at least one polymer selected from the group consisting of polybutadiene, polyisoprene, styrene-butadiene copolymer, acrylonitrile-butadiene copolymer, polychloroprene, natural rubber, styrene-butadiene block copolymer, ethylene-propylene-diene terpolymer, polypentenamer, polyoctenamer, and butyl rubber.

7. A process according to claim 1, wherein the coordination compound of W or Mo is at least one compound selected from the group consisting of carbonyl complexes and substituted carbonyl complexes represented by the general formula: $(CO)_n ML_m$ or $D(CO)_n ML'_m$, wherein M is W or Mo, L is $QR^c{}_3$, an alkene or alkadiene having 2 to 20 carbon atoms, an aromatic hydrocarbon having 6 to 20 carbon atoms, a cyclopentadienyl group, an allyl group,

$R^c CN$, or pyridine, L' is a halogen,

or $-R^a$, D is hydrogen, Li or $R^d{}_4 N$, n is an integer of 1 to 6, and m is 0 or an integer of 1 to 4, n+m being 4, 5 or 6 [Q is N, P, As or Sb, $R^a$ and $R^c$ are hydrocarbon radicals having 1 to 20 carbon atoms, $R^d$ is a hydrocarbon radical having 1 to 10 carbon atoms, and $R^b$ is a hydrocarbon radical having 1 to 20 carbon atoms or $OR^e$ ($R^e$ is a hydrocarbon radical having 1 to 20 carbon atoms)].

8. A process according to claim 1 wherein the coordination compound of W or Mo is at least one compound selected from the group consisting of carbonyl-carbene complexes represented by the general formula, $(CO)_5 MCR^a R^b$ or $D(CO)_5 MCOR^a$, wherein M, D, $R^a$ and $R^b$ are as defined in claim 8.

9. A process according to claim 1, wherein the titanium tetrahalide is titanium tetrachloride.

10. A process according to claim 1, wherein the N-halogen-substituted cyclic acid imide is at least one imide selected from the group consisting of N-chlorosuccinic acid imide and N-chlorophthalic acid imide.

11. A process according to claim 1, wherein the sulfide, sulfoxide and phosphine are at least one member selected from the group consisting of dimethyl sulfide, methyl ethyl sulfide, ethyl isopropyl sulfide, di-tert-butyl sulfide, diphenyl sulfide, dimethyl sulfoxide, methyl ethyl sulfoxide, ethyl isopropyl sulfixide, di-tert-butyl sulfoxide, diphenyl sulfoxide, tetrahydrothiophene, ethylphosphine, propylphosphine, phenylphosphine, diethylphosphine, dipropylphosphine, ethylphenylphosphine, diethylphenylphosphine, diphenylphosphine, triethylphosphine, ethyldiphenylphosphine, triphenylphosphine, tricyclohexylphosphine, diphenylbenzylphosphine, tri(p-tolyl)phosphine, tri(o-tolyl)phosphine, and trinaphthylphosphine.

12. A process according to claim 1, wherein the norbornene derivative is 5-norbornene-2-nitrile, methyl 5-norbornene-2-carboxylate, 5-chloromethyl-2-norbornene, or N,N-dimethyl-5-norobornene-2-carboxylic acid amide and the catalyst consists essentially of (n) $(CO)_5WC(OC_2H_5)C_6H_5$ or $[(CH_3)_4N][(CO)_5WCOC_6H_5]$ and (b) $TiCl_4$.

13. A process according to claim 1, wherein the norbornene derivative is methyl 5-norbornene-2-carboxylate, 5-norbornene-2-nitrile, 2-methyl-5-norbornene-2-nitrile, tribromophenyl 5-norobornene-2-carboxylate or 5-chloromethyl-2-norbornene and the catalyst consists essentially of (a) $(CO)_5WC(OC_2H_5)C_6H_5$ or $[(CH_3)_4N][(CO)_5WCOC_6H_5]$, (b) $TiCl_4$ and (c) triphenylphosphine, dimethyl sulfoxide, di-tert-butyl sulfide, triethylphosphine or N-chlorosuccinic acid imide.

14. A process according to claim 1, wherein the amount of the catalyst component (a) is 0.01 to 20 millimoles per mole of the total reactants and the amount of the component (b) is 1 to 200 moles per mole of the component (a).

15. A process according to claim 1, wherein the amount of the catalyst component (a) is 0.01 to 20 mmoles per mole of the total reactants, the amount of the catalyst component (b) is 1 to 50 moles per mole of the component (a), and the amount of the catalyst component (c) is 0.1 to 10 mmoles per mole of the component (a).

16. A process according to claim 1, wherein before contacting with the monomer, the catalyst is heat-treated at a temperature higher than the reaction temperature of the monomer.

17. A process according to claim 1, wherein the catalyst is exposed to rays of 200 to 700 nm in the presence or absence of the reactants.

18. A process according to claim 1, wherein the reactants are contacted with the catalyst at a temperature in the range of −30° to 200° C.

19. A process according to claim 1, wherein the concentration of the reactants is 0.1% by weight or more.

* * * * *